United States Patent
Balbian et al.

(10) Patent No.: US 11,083,174 B2
(45) Date of Patent: Aug. 10, 2021

(54) COMMUNICATION ASSEMBLY FOR MONITORING BIOLOGICAL DATA OF ANIMALS

(71) Applicant: Zalliant, LLC, Amsterdam, NY (US)

(72) Inventors: John Michael Balbian, Amsterdam, NY (US); Andrew Leon Skidmore, Findlay, OH (US)

(73) Assignee: ZALLIANT, LLC, Amsterdam, NY (US)

( * ) Notice: Subject to any disclaimer, the term of this patent is extended or adjusted under 35 U.S.C. 154(b) by 543 days.

(21) Appl. No.: 15/933,508

(22) Filed: Mar. 23, 2018

(65) Prior Publication Data
US 2018/0271066 A1    Sep. 27, 2018

Related U.S. Application Data

(60) Provisional application No. 62/476,306, filed on Mar. 24, 2017.

(51) Int. Cl.
| | | |
|---|---|---|
| *G01F 23/36* | (2006.01) |
| *A01K 29/00* | (2006.01) |
| *A01K 11/00* | (2006.01) |
| *H01Q 1/24* | (2006.01) |
| *H01Q 1/27* | (2006.01) |

(52) U.S. Cl.
CPC .......... *A01K 29/005* (2013.01); *A01K 11/007* (2013.01); *H01Q 1/24* (2013.01); *H01Q 1/273* (2013.01)

(58) Field of Classification Search
CPC ...... A01K 29/005; A01K 11/007; H01Q 1/24; H01Q 1/273; H04B 5/0075; H04B 5/00; H04B 5/0081; H04B 5/0087; H04B 5/0093; H04B 5/0031; H04B 5/0037; H04B 2561/164; H04B 5/6804; H01F 38/14; H01L 2223/6677; H01L 2924/0002; H01L 24/00; H01L 2224/00; H01L 2924/3025; H01L 23/5387; H01L 23/645; H01L 23/66; H01L 25/0655; H02J 50/10; H02J 50/005; H02J 50/12; H02J 50/20; H02J 50/40; H02J 50/70; H02J 7/025

See application file for complete search history.

(56) References Cited

U.S. PATENT DOCUMENTS

| | | |
|---|---|---|
| 7,062,308 B1 | 6/2006 | Jackson |
| 7,918,185 B2 | 4/2011 | Araki et al. |
| 8,297,231 B2 | 10/2012 | Yanai et al. |
| 8,771,201 B2 | 7/2014 | Gabriel et al. |
| 8,979,757 B2 | 3/2015 | Mottram et al. |

(Continued)

*Primary Examiner* — Hai Phan
*Assistant Examiner* — Anthony D Afrifa-Kyei
(74) *Attorney, Agent, or Firm* — Hoffman Warnick LLC

(57) ABSTRACT

Embodiments of the present disclosure relate to communication assemblies for animal health sensors. A communication assembly according to the disclosure can include: a network transceiver mounted on a circuit board; an antenna electrically coupled to the circuit board; and a resinous material encapsulating the antenna and the network transceiver therein, wherein the antenna is configured to transmit signals from the network transceiver through the resinous material; and a casing encapsulating at least the network transceiver, the antenna, and the resinous material therein, wherein the casing includes a plastic or ceramic material.

16 Claims, 5 Drawing Sheets

(56) References Cited

U.S. PATENT DOCUMENTS

| | | |
|---|---|---|
| 9,456,584 B2 | 10/2016 | McLaughlin |
| 9,538,729 B2 | 1/2017 | Yarden |
| 2008/0319280 A1* | 12/2008 | August ................ A61B 5/0031 |
| | | 600/301 |
| 2009/0111393 A1* | 4/2009 | Scalisi ............... G06K 19/0723 |
| | | 455/90.1 |
| 2009/0187392 A1* | 7/2009 | Riskey ................ A01K 11/008 |
| | | 703/11 |
| 2013/0051438 A1* | 2/2013 | Lee ...................... H04B 7/0608 |
| | | 375/219 |
| 2013/0197323 A1* | 8/2013 | Rettedal ................... A61D 7/00 |
| | | 600/302 |
| 2016/0037755 A1 | 2/2016 | Webster et al. |
| 2016/0135426 A1 | 5/2016 | Harty et al. |
| 2016/0227742 A1 | 8/2016 | Rovnyi et al. |
| 2016/0310012 A1 | 10/2016 | Mankowski |
| 2016/0360994 A1* | 12/2016 | Rettedal ............... A01K 11/007 |
| 2018/0085605 A1* | 3/2018 | Maharbiz ........... A61N 1/37205 |

\* cited by examiner

COMMUNICATION ASSEMBLY FOR MONITORING BIOLOGICAL DATA OF ANIMALS

BACKGROUND

Technical Field

The present disclosure relates to systems for monitoring the health of animals in large environments, and more specifically, to communication assemblies and related apparatuses for transmitting biological data for one or more animals over long distances.

Related Art

Systems and processes for assisting managers of livestock in agricultural fields, e.g., farming, animal breeding, etc., have grown increasingly sophisticated to match rising consumer demands and to reduce costs. Improvements in the realm of technology, in particular, has enabled the development of centralized systems for managing various challenges in the care of animals, e.g., measurements and decision-making relative to the health of the animals. Various communication platforms and base station systems have been adapted to transmit data to and/or receive data from various types of sensors connected to or housed within an animal to reduce the time associated with measuring biological data for animals and making decisions based on those measurements.

Present systems are limited by distance and/or inherent limitations of the chosen networking technology. In particular, conventional systems have proven to be ineffective, or even inoperable, for animals which roam over wide surface areas (generally referred to as pasture animals, mobile animals, etc.). Such issues are especially prevalent in American farms, e.g., where animals may be able to roam over a surface area much larger than similar spaces for livestock and animals in more densely populated countries, e.g., the United Kingdom, Ireland, and other European countries. Adapting longer-range communications technology to suit longer-distance applications has proven to be a technical challenge.

SUMMARY

A first aspect of the disclosure provides a communication assembly including: a network transceiver mounted on a circuit board; an antenna electrically coupled to the circuit board; and a resinous material encapsulating the antenna and the network transceiver therein, wherein the antenna is configured to transmit signals from the network transceiver through the resinous material; and a casing encapsulating at least the network transceiver, the antenna, and the resinous material therein, wherein the casing includes a plastic or ceramic material.

A second aspect of the disclosure provides a communication assembly including: a network transceiver mounted on a circuit board; an antenna electrically coupled to the circuit board; a controller electrically coupled to the network transceiver, the circuit board, and a battery, wherein the network transceiver adjusts a power output of the battery through the controller to transmit signals from the antenna at a predetermined interval; a temperature sensor electrically coupled to the network transceiver; a resinous material encapsulating the antenna and the network transceiver therein, wherein the antenna is configured to transmit signals through the resinous material; and a casing encapsulating at least the network transceiver, the antenna, and the resinous material therein, wherein the casing includes a plastic or ceramic material.

A third aspect of the disclosure provides an apparatus for communicating biological data of an animal, the apparatus comprising: a network transceiver mounted on a circuit board; an antenna electrically coupled to the circuit board; and a resinous material encapsulating the antenna and the network transceiver therein, wherein the antenna is configured to transmit signals from the network transceiver through the resinous material; and a casing encapsulating at least the network transceiver, the antenna, and the resinous material therein, wherein the casing includes a plastic or ceramic material, and wherein the casing is adapted to fluidly separate the network transceiver, the resinous material, and the antenna from a monitored portion of an animal.

BRIEF DESCRIPTION OF THE DRAWINGS

The embodiments of this disclosure will be described in detail, with reference to the following figures, wherein like designations denote like elements, and wherein.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Figure 1:
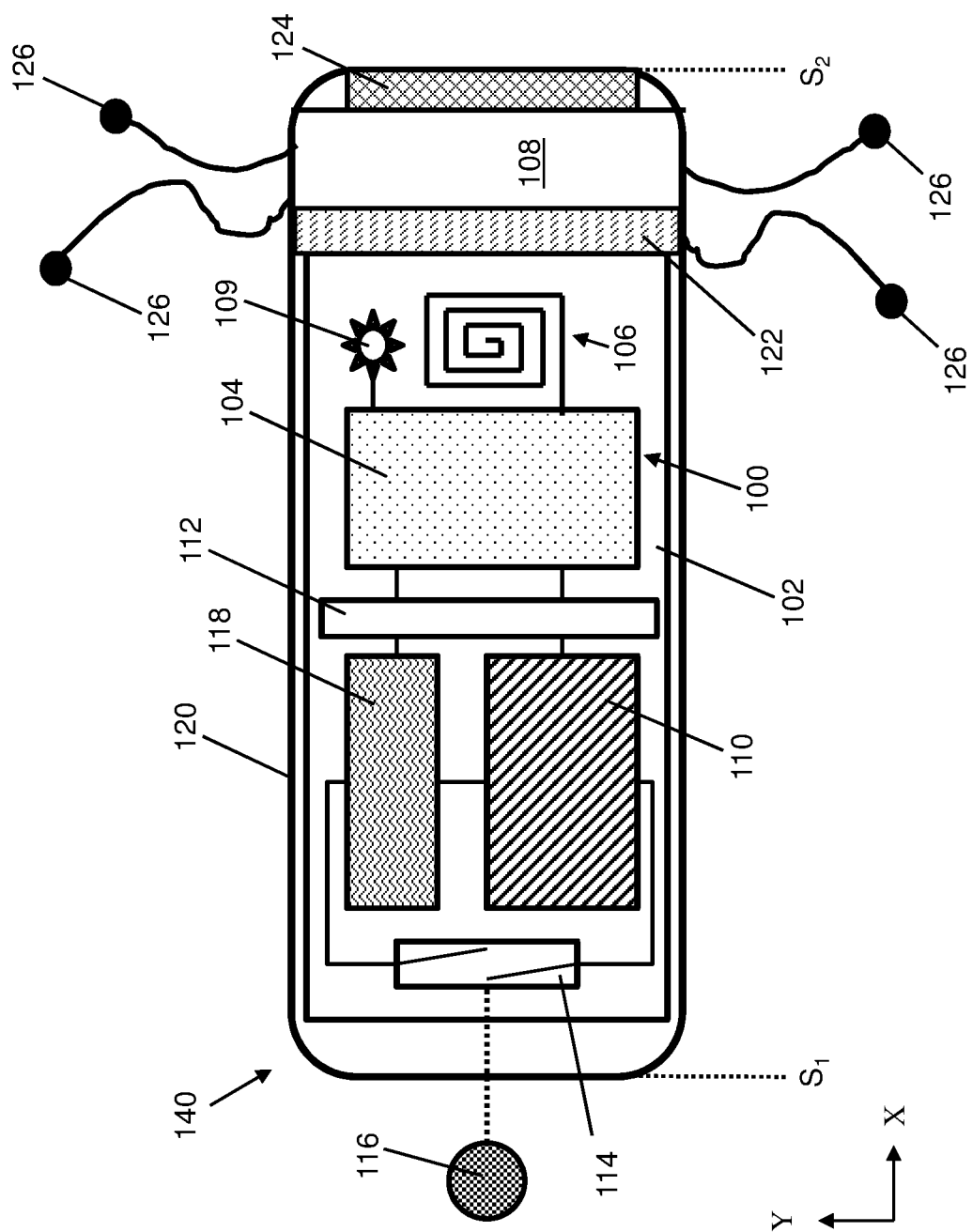
FIG. 1 shows a cross-sectional view in plane X-Y of a communication assembly and apparatus for transmitting biological data of an animal according to embodiments of the disclosure.
Figure 2:
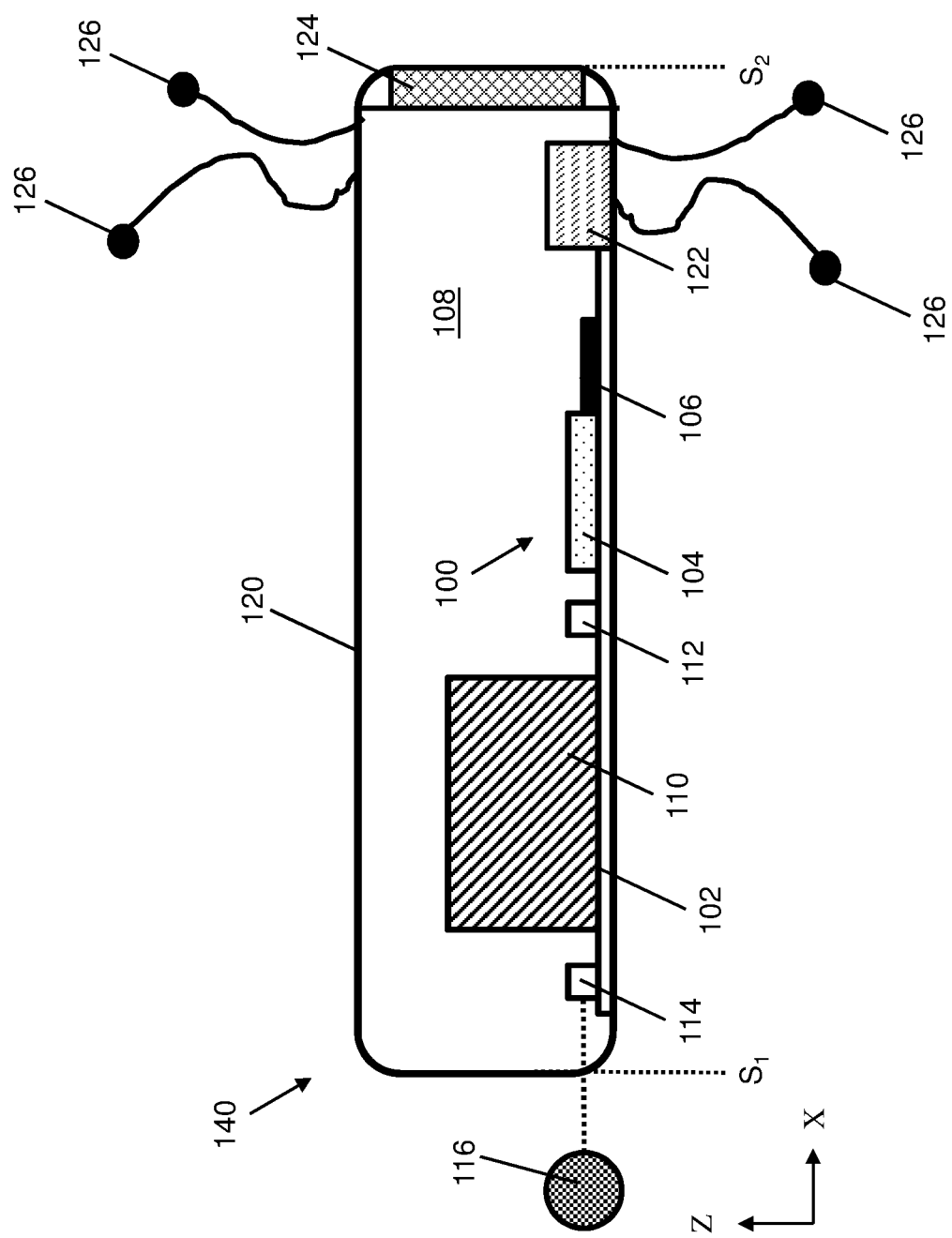
FIG. 2 shows a cross-sectional view in plane X-Z of a communication assembly and apparatus for transmitting biological data of an animal according to embodiments of the disclosure.

Referring to FIGS. 1-2 together, a communication assembly 100 according to embodiments of the disclosure is shown. Communication assembly 100 can be adapted for use, e.g., as part of a larger apparatus for measuring and transmitting biological data of one or more animals as described herein. Communication assembly 100 can be adapted for use with different wireless networks and/or communications protocols as compared to conventional devices for the remote monitoring of biological data of multiple animals. Various structural and operational features of communication assembly 100 are discussed herein, in addition to other features of components operatively connected to and/or configured to interact with communication assembly 100.

Communication assembly 100 can include, e.g., a circuit board 102 with a network transceiver 104 mounted thereon. Circuit board 102 can be embodied as any currently known or later developed device for allowing the communication and transmission of electrical currents, signals, etc., between interconnected elements. Such elements may be mechanically coupled to circuit board 102, e.g., by being soldered, embedded, and/or otherwise connected to circuit board 102. To this extent, circuit board 102 may include one or more conductive and/or semiconductive materials to provide electrical communication and/or to provide one or more functions as described herein. Circuit board 102 can be sized and shaped to accommodate particular settings and/or animals to be monitored. In an example embodiment, circuit board 102 can have a length dimension along axis X of between approximately six centimeters (cm) and approximately nine cm, and a width dimension along axis Y of approximately two cm. Circuit board 102 may have a thickness of, e.g., between approximately one millimeter (mm) and approximately two mm, without including for the size and position of elements mounted thereon. Electrical connections on circuit board 102 between various components of communication assembly 100 are depicted in FIG. 1, e.g., by way of solid lines extending between each component.

A network transceiver 104 of communication assembly 100 can be mounted on circuit board 102 and electrically coupled thereto to provide electrical communication with other elements. Network transceiver 104 may generally include any device which incorporates transmitter and receiver components in a combined circuitry. More specifically, network transceiver 104 can enable wireless telecommunication between communication assembly 100 and external devices, e.g., as part of a network of devices interconnected through the same area network. Network transceiver 104 can thus send and receive radio waves across a predetermined band of frequencies to enable communication with other devices connected by the same network. To address the technical situation of animals distributed across a vast region, e.g., several square miles, network transceiver 104 may be embodied as one or more instruments configured to communicate through a low-power wide-area network (LPWAN) or low-power network (LPN), e.g., to communicate at a reduced bit rate to enable operation over extended separation distances as compared to other devices. According to an example embodiment, network transceiver 104 can include a customized card for communicating over one or more proprietary communications networks and/or protocols, e.g., the propriety "LoRa Alliance™" specification, and/or other proprietary or non-proprietary wireless networking specifications. In this case, network transceiver 104 can be configured to send and receive wireless data signals having a frequency of between approximately nine-hundred megahertz (MHz) and approximately nine-hundred and fifty MHz. According to a specific example, network transceiver 104 can communicate signals having a frequency of approximately nine-hundred and fifteen MHz. Various properties of network transceiver 104 are discussed elsewhere herein, e.g., through their relationship with other components and/or devices.

Communication assembly 100 can also include one or more antennas 106 electrically coupled to circuit board 102, e.g., through network transceiver 104. Antenna 106 may include any currently known or later developed type of antenna for providing wireless transmission and receipt of communications as directed by network transceiver 104. According to an example, antenna 106 may be printed or mounted directly or indirectly (e.g., with zero or more intermediate structural elements) onto a surface of circuit board 102 and/or may be directly electrically connected to network transceiver 104 of communication assembly 100. In such cases, antenna 106 may be sized to a relatively compact square surface area on circuit board 102 in plane X-Y of, e.g., approximately twenty mm by approximately 20 mm. According to other examples, antenna 106 may take the form of, e.g., one or more solenoid antennas and/or other types of antennas configured for use with circuit board 102, network transceiver 104, etc. To accommodate the free movement of animals across a wide surface area, antenna 106 can be configured to send and transmit signals in an omnidirectional manner. Interference between antenna 106 and other components of communication assembly 100 can thus be reduced or eliminated by positioning antenna 106 opposite a first end $S_1$ of communication assembly 100 and proximate a second end $S_2$ of communication assembly 100, e.g., such that a battery (e.g., battery 110 discussed herein) or similar component is not positioned between antenna 106 and an outermost end (e.g., second end $S_2$) of communication assembly 100. The size, shape, and composition of antenna 106 can be adapted to transmit signals through one or more resinous materials of communication assembly 100 as discussed herein.

Communication assembly 100 can include a resinous material 108, e.g., polyurethane and/or other currently known or later-developed potting materials, which encapsulates at least network transceiver 104 and antenna 106 therein. In this regard, antenna 106 and resinous material 108 can be adapted to accommodate the transmission of wireless signals therethrough to allow the exchange of data over extended distances as discussed herein. Before resinous material 108 is formed and/or applied, the remainder of communication assembly (e.g., circuit board 102) can be coated (e.g., spray coated, dip coated, etc.) with one or more water-resistant electrically insulating materials, e.g., polypropylene and/or other similar materials currently-known or later developed. Resinous material 108 can be formed, e.g., by storing circuit board 102, network transceiver 104, antenna 106, and/or other components discussed herein at an elevated temperature (e.g., approximately forty-five degrees Celsius) over a predetermined time (e.g., approximately two hours) to remove any humidity, condensation, etc., therefrom. Afterward, the contents of communication assembly 100 can be coated with an uncured resin, e.g., polyurethane resin, other urethane substances, silicone elastomers, epoxies, and/or other liquid resinous materials. According to further embodiments, resinous material 108 may be selected to have a transparent or translucent composition, such that other components of communication assembly 100 are at least partially visible through resinous material 108. Such materials may include, e.g., one or more potting materials currently known or later-developed. The uncured resin can then rest at room or elevated temperature (e.g., up to approximately sixty-five degrees Celsius) over a predetermined time (e.g., six hours, twenty-four hours, etc.), such that resinous material 108 solidifies to wholly encapsulate circuit board 102, network transceiver 104, antenna 106, and/or other components of communication assembly 100 therein. In some cases, the curing temperature can be adjusted to prevent negative effects to the battery's lifespan.

After curing, solidifying, etc., to encapsulate communication assembly 100, resinous material 108 can guard communication assembly 100. Resinous material 108 can take the form of a solid, gelatinous, and/or other compound having a structure and composition sufficient to guard against abrasion, shock, vibration, impact, ultraviolet light, fungus, moisture (including, e.g., immersion in salt water or corrosive acid(s)), and/or other external perturbations. The material composition of resinous material 108 can also be selected to permit passage of transmitted signals therethrough with no significant interference or loss of information. To further aid signal transmission, resinous material 108 can be cured to have as much transparency as possible and thus a minimum level of interference with signals passing therethrough. Furthermore, resinous material 108 can be processed before, during, or after its material composition cures to prevent air bubble formation in close proximity (e.g., within three millimeters) of antenna 106 to reduce or prevent modifications to transmitted signals. To this extent, the thickness of resinous material 108 about materials encapsulated therein can vary to suit predetermined technical specifications. In the case of polyurethane resin, resinous material 108 thus can be processed to permit transmission of signals therethrough having wavelengths of, e.g., between approximately 850 MHz and approximately 950 MHz.

In some cases, communication assembly 100 may allow a user to identify one or more measured quantities and/or operating conditions of communication assembly 100. For instance, assembly 100 may include a display 109 electrically coupled to network transceiver 104, and antenna 106 through network transceiver 104. Display 109 may take the form of a screen, one or more a light emitting diodes (LEDs), and/or other device for communicate various forms of information to an observer. Display 109 may be capable of emitting lights with different colors and/or over different time periods to communicate various forms of information to observers. Display 109 may also be configured to emit audio outputs in addition to or instead of visual outputs. Display 109 may communicate several types of information to a user, e.g., the amount of electrical power remaining in communication assembly 100. Display 109 may additionally or alternatively inform a user of a classification, type, and/or serial number of communication assembly 100 or subcomponents thereof. In other cases, display 109 may be configured to show various forms of information measured, collected, transmitted, etc., with or through communication assembly 100. As noted elsewhere herein, display 109 may be visible through resinous material 108.

Communication assembly 100 can include features for regulating power consumption, e.g., to minimize the loss of power to accommodate varied situations. For example, communication assembly 100 can include one or more batteries 110 for supplying electrical power to network transceiver 104, antenna 106, display 109, and/or other components. Battery 110 of communication assembly 100 can include, e.g., one or more batteries including lithium and/or other materials for providing a relatively long lifespan at low voltage, e.g., a battery configured to operate for approximately six years while intermittently yielding a power supply of between, e.g., approximately three volts (V) and approximately four V. A controller 112 can be electrically coupled to circuit board 102, network transceiver 104, display 109, battery 110, and/or other components. Controller 112 can include software and/or hardware instructions embedded thereon to control the timing, amount, and/or manner in which electrical current is transmitted to transceiver 104, antenna 106, and/or other components. In particular, controller 112 can be configured to adjust one or more time intervals between each signal broadcast by network transceiver 104 and antenna 106 according to various instructions, processes, etc., described herein.

Communication assembly 100 can optionally include one or more switches 114 configured to govern the operation of battery 110 and/or other components for receiving and sending biological data (e.g., network transceiver 104, antenna 106, display 109, battery 110, controller 112, etc.). In an embodiment, switch 114 can include a magnetically actuated switch initially biased into an "on" position (e.g., current travel therethrough is permitted), but capable of being actuated into an "off" position (e.g., current travel therethrough is prevented) when subjected to a magnetic field. A "magnetically actuated switch" can refer to any currently-known or later-developed electrical switch which moves between an "off" (e.g., open circuit) position and an "on" (e.g., closed circuit) position by the action of magnetic flux, and in particular can include reed switches, or similar magnetically actuated elements such as a Hall Effect sensor, a magnetic actuator, etc. A Hall Effect sensor refers to an electrical transducer which outputs a higher electrical voltage when in the proximity of a magnet. A magnetic actuator refers to a component which converts an electromagnetic input into a mechanical output, e.g., to extend or retract an electrically conductive component to form or break an electrical connection between two components. In alternative embodiments, the "on" position may correspond with an open circuit while the "off" position may correspond with a closed circuit. According to one example, switch 114 can be composed of a ferrous material and/or other metals which move in response to magnetic fields, e.g., two ferrous wires in physical proximity but not in contact with each other. Switch 114 in some cases, can form part of an external circuit relative to circuit board 102, such that switch 114 externally transmits an "interrupt" signal to switch board operations on and off as desired.

A magnet 116 may be positioned proximal to communication assembly 100 such that a magnetic field (shown in phantom) transmits magnetic flux through switch 114 to actuate switch 114 between different positions. In this manner, magnet(s) 116 can control battery 110, e.g., by actuating switch 114 between "on" and "off" positions. As illustrated, magnet 116 (provided independently and/or as part of a tool for controlling communication assembly 100) can actuate switch 114 without contacting communication assembly 100 and/or other structures for housing communication assembly 100. Although switch 116 being in an "on" position generally corresponds to a closed electrical circuit in the examples described herein, it is understood that this may be reversed in alternative scenarios. For example, circuit board 102 may include one or more logic circuits which associate a current flow through switch 114 with "on" or "off" states. In such implementations, each switch 114 need not directly control a flow of electrical power to battery 110, but instead may control the flow of electrical signals to controller 112 that controls other components configured to selectively control communication assembly 100. Such circuitry of circuit board 102 can be manipulated or defined such that an "on" corresponds to an open circuit across switch 114. Likewise, a user may define the "off" position to correspond to a closed circuit across switch 114. To prevent electrical interference between communication with antenna 106, switch 114 may be positioned at an end of communication assembly 100 opposite antenna 106 (e.g., ends $S_1$ and $S_2$, respectively).

Various processes for using switch 114 to adjust the operation of communication assembly 100 are described elsewhere herein.

Communication assembly 100 can include or otherwise be connected to one or more sensors 118 (FIG. 1) for measuring various forms of biological data for determining one or more related status conditions of an animal. It is understood that sensor(s) 118 can variously be adapted to one or more biological properties of an animal including without limitation: pH level of one or more fluids, water intake, gas exchange properties, calving status, speed, acceleration, location, rumination, ingestion, etc. To this extent, sensor(s) 118 can include any currently-known or later developed instrument for directly or indirectly measuring the status condition of an animal by taking and/or deriving various quantities for encoding, transmission, and/or storage as electronic data. In a first example, sensor 118 can take the form of an accelerometer, gyrometer, potted sensor, and/or other instrument for measuring kinetic properties of an animal and/or monitored portions thereof. Such kinetic properties may include, e.g., the lying time, travel time, position, resting time, standing time, activity level, and/or related measurements based on the location, speed, acceleration, etc., of an animal. In further embodiments, sensor 118 can take the form of a ruminal thermometer adapted to measure various properties of an animal's rumen and/or digestive system, e.g., temperature, pH level, measurements of ingestion, measurements of excretion, etc. In still further embodiments, sensor 118 can monitor the reproductive status and/or health of an animal to monitor estrus status and related properties, e.g., birthing status. However embodied, sensor 118 can take the form of any currently-known or later developed instrument for measuring such properties of an animal and/or other properties to be encoded, stored, transmitted, etc., as data.

According to an example, sensor 118 can include one or more temperature sensors (e.g., various thermometers) for measuring various biological attributes of an animal proximate a monitored biological portion of the animal, e.g., a tissue, an organ, a system, a body region, etc., where communication assembly 100 is located. Temperature is used herein as an example property measured with sensor(s) 118 for the sake of providing illustrative examples, and it is understood that one or more other properties described herein or detectable by other sensors may be added or substituted for temperature where appropriate. Sensor 118 can thus take the form of any currently known or later-developed instrument for measuring the temperature of an animal at a particular location, and as an example may include one or more volumetric thermometers, radiometric thermometers, pressure-based thermometers, and/or other devices for measuring temperature.

The various components of communication assembly 100 may be housed within a casing 120 surrounding and partially or completely encapsulating resinous material 108 and other components therein. Casing 120 can be sized and shaped to accommodate the various elements of communication assembly 100 discussed herein, and according to an example may take the form of a capsule with a diameter, e.g., of approximately three cm and a length of, e.g., approximately eleven cm, to allow communication assembly 100 to be placed inside of an animal (e.g., within a stomach, birth canal, and/or other internal organ). The material composition of casing 120 can be varied to accommodate different types of animals and/or locations of use. According to an example, casing 120 can include one or more plastics, ceramics, biocompatible materials, and/or other materials which do not react with and/or cause contamination by or to the organs of an animal. In some situations, casing 120 may include or be housed within an ingestible bolus such that communication assembly 100 is adapted to transmit biological data of an animal from within the animal's digestive system. According to another example, casing 120 may be mechanically coupled to a collar outside the animal, a thermometer configured for insertion into one or more bodily regions internally within (e.g., oral, rectal, vaginal, nasal, digestive, and/or other areas) or externally on a portion of an animal. Casing 120, in addition, may be shaped to fluidly separate resinous material 108 and antenna 106 from one or more internal organs of an animal positioned outside casing 120. Casing 120 additionally or alternatively may be adapted for other settings such as being positioned outside of an animal (e.g., by being connected to a collar, ID tag, etc.).

Communication assembly 100 can optionally include further components for allowing a user to obtain and interpret biological data for animals over long distances. As shown, communication assembly 100 can include and/or otherwise be in communication with a tracking unit 122 for identifying the location of communication assembly 100 and one or more associated animals. Tracking unit 122 can thus be configured to use one or more tracking systems, e.g., the global positioning system (GPS) system, for locating communication assembly 100 relative to a larger environment. Tracking unit 122 thus may be configured to interact with circuit board 102 and/or may be wholly independent from circuit board 102, e.g., by being tracked by an independent radio and/or satellite tracking system, e.g., triangulation using received signal strength display (RSSI) networking, propagation delay, etc.

Casing 120 can optionally include further components to enhance the operation of communication assembly 100 when deployed within and/or otherwise used in connection with one or more animals. For instance, casing 120 can include a resinous seal 124 for fluidly sealing resinous material 108 and/or other components within casing 120. Resinous seal 124 can include one or more cured resinous materials included within resinous material 108, and/or may include different resinous materials (e.g., thermoplastics and/or other polymer-based materials) configured to withstand contact with external fluids. Casing 120 can also include, e.g., one or more external mounts 126 for removably attaching casing 120 to the organs of an animal, e.g., a stomach lining, birth canal interior, and/or other internal organ. As examples, external mounts 126 may include one or more plastic materials and/or adhesive coatings configured to hold casing 120 in a fixed position. As shown, external mounts 126 may be provided in a variety of shapes to accommodate different positions and/or different interior cross-sections within an animal.

The various components described herein can together form an apparatus 140, e.g., an animal health sensor assembly, for monitoring the biological data of an animal over long distances. To this extent, apparatus 140 can include communication assembly 100 and components thereof, e.g., circuit board 102, wireless transceiver 104, antenna 106, and resinous material 108 and other components operably connected thereto, e.g., battery 110, controller 112, switch 114, sensor 118, casing 120, tracking unit 122, resinous seal 124, external mounts 126, etc. It is understood that apparatus 140 can thus include all or some of the various components described herein to provide active monitoring of animals over a network and across vast distances, e.g., by enabling the transmission of signals through resinous material 108 at predetermined frequencies.

Figure 3:
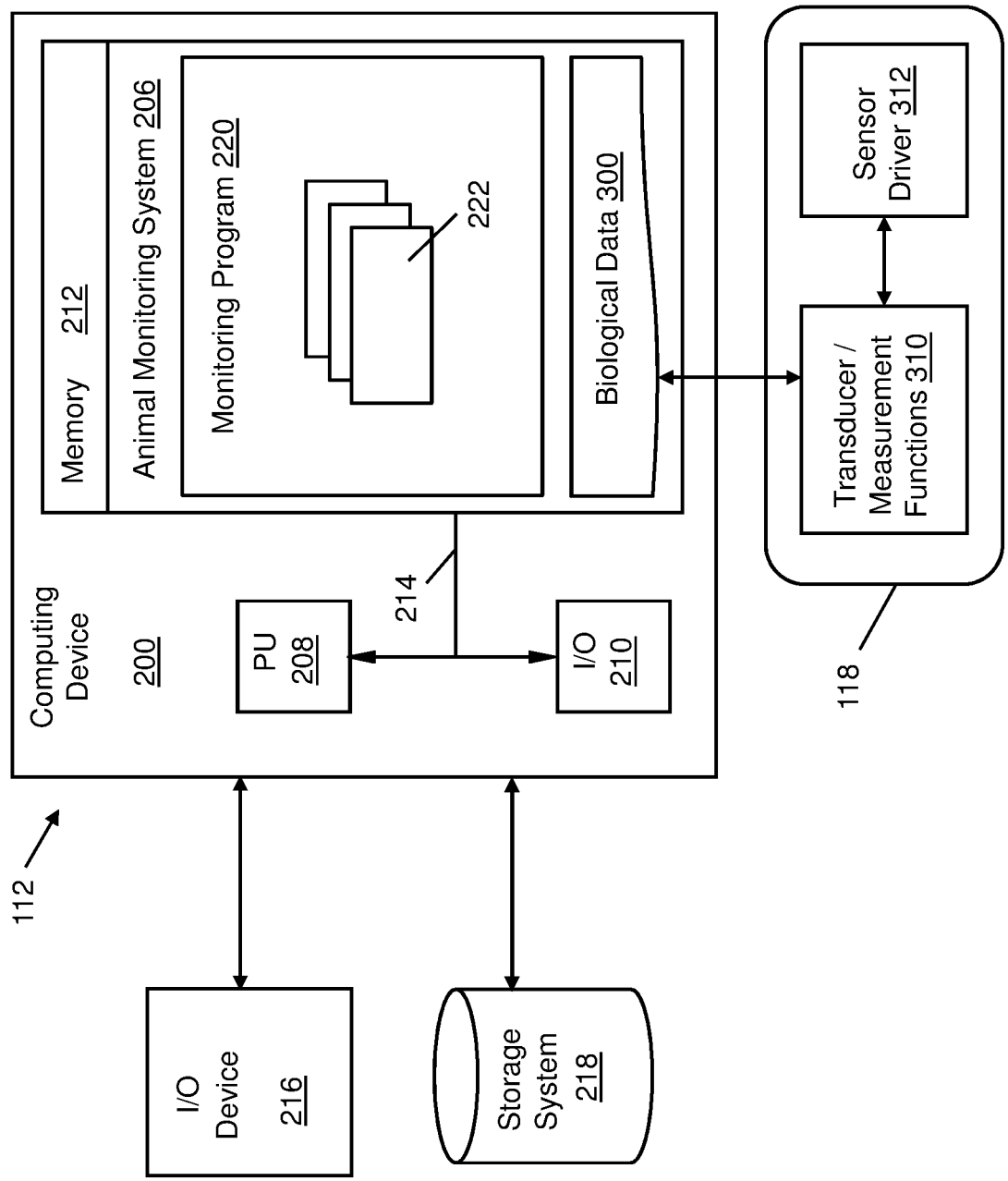
FIG. 3 shows a schematic view of an illustrative environment for deploying a controller for a communication assembly according to embodiments of the disclosure.
Figure 4:
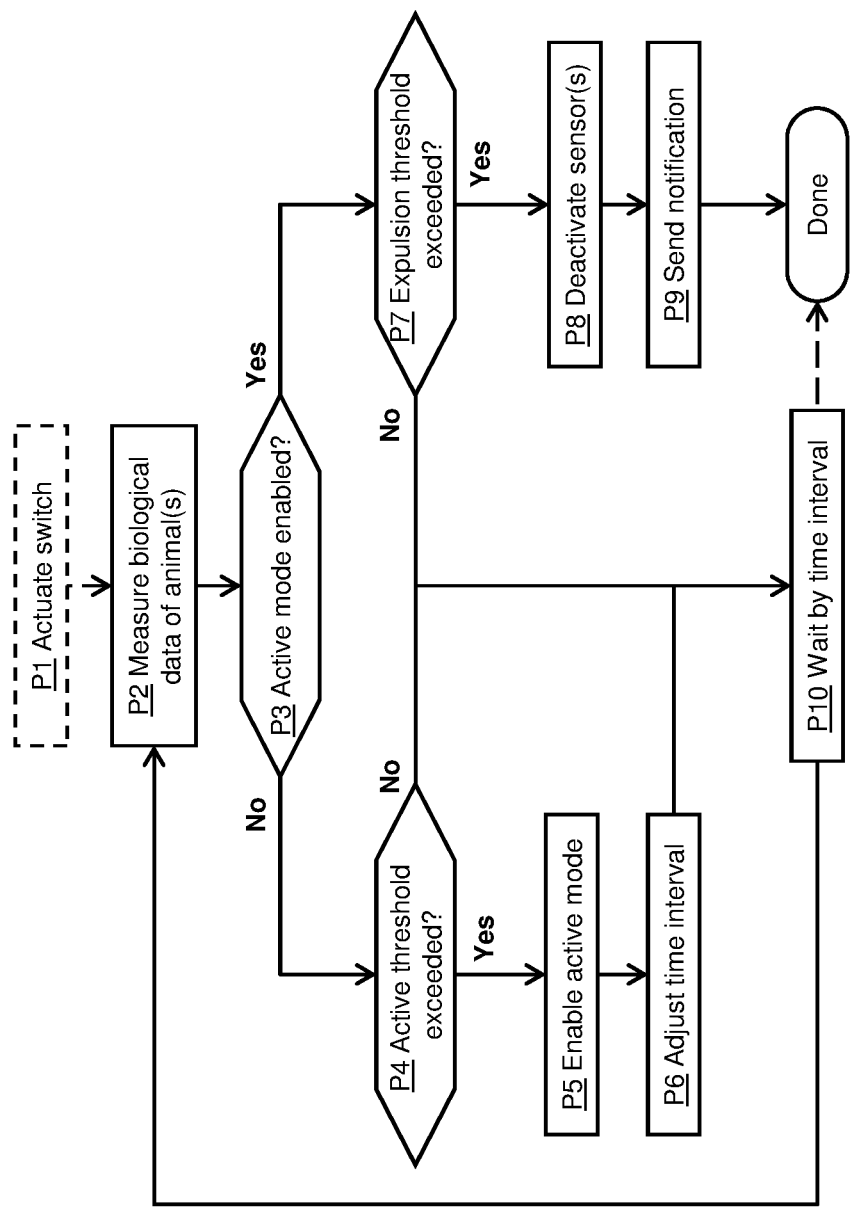
FIG. 4 shows an illustrative flow diagram for operating a communication assembly according to embodiments of the disclosure.

Turning to FIG. 3, embodiments of the present disclosure can include one or more controllers 112 included within and/or communicatively connected to communication assembly 100 and/or apparatus 140 for executing processes to measure and interpret biological data of an animal, control the consumption of power based on or more situations, etc. To further illustrate the operational features and details of controller 112, an illustrative embodiment of a computing device 200 is discussed herein. Controller 112, computing device 200, and sub-components thereof are illustrated with a simplified depiction to demonstrate the role and functionality of each component. In particular, controller 112 can include computing device 200, which in turn can include an animal monitoring system 206. The configuration shown in FIG. 3 is one embodiment of a system for reading, transmitting, interpreting, etc., biological data pertaining to one or more animals. As discussed herein, computing device 200 can analyze the various readings by sensor(s) 118 to read or interpret biological data for one or more animals. Furthermore, embodiments of the present disclosure can perform these functions automatically and/or responsive to user input by way of an application accessible to a user or other computing device. Such an application may, e.g., exclusively provide the functionality discussed herein and/or can combine embodiments of the present disclosure with a system, application, etc., for remotely controlling communication assembly 100. Embodiments of the present disclosure may be configured or operated in part by a technician, computing device 200, and/or a combination of a technician and computing device 200. It is understood that some of the various components shown in FIG. 3 can be implemented independently, combined, and/or stored in memory for one or more separate computing devices that are included in computing device 200. Further, it is understood that some of the components and/or functionality may not be implemented, or additional schemas and/or functionality may be included as part of animal monitoring system 206.

Computing device 200 can include a processor unit (PU) 208, an input/output (I/O) interface 210, a memory 212, and a bus 214. Further, computing device 200 is shown in communication with an external I/O device 216 and a storage system 218. External I/O device 216 may be embodied as any component for allowing user interaction with controller 112, and as an example may include magnet 116 (FIGS. 1-2) and/or other tools for actuating switch 114 (FIGS. 1-2). Animal monitoring system 206 can execute a monitoring program 220, which in turn can include various modules 222, e.g., one or more software components configured to perform different actions, including without limitation: a calculator, a determinator, a comparator, etc. Modules 222 can implement any currently known or later developed analysis technique for recording and/or interpreting various measurements to provide data with respect to biological data for one or more animals. As shown, computing device 200 may be in communication with one or more sensors 118 for measuring and interpreting the biological data of an animal.

Modules 222 of monitoring program 220 can use algorithm-based calculations, look up tables, and similar tools stored in memory 212 for processing, analyzing, and operating on data to perform their respective functions. In general, PU 208 can execute computer program code to run software, such as animal monitoring system 206, which can be stored in memory 212 and/or storage system 218. While executing computer program code, PU 208 can read and/or write data to or from memory 212, storage system 218, and/or I/O interface 210. Bus 214 can provide a communications link between each of the components in computing device 200. I/O device 216 can comprise any device that enables a user to interact with computing device 200 or any device that enables computing device 200 to communicate with the equipment described herein and/or other computing devices. I/O device 216 (including but not limited to keyboards, displays, pointing devices, etc.) can be coupled to controller 112 either directly or through intervening I/O controllers (not shown).

Memory 212 can also store various forms of biological data 300 pertaining to an animal where communication assembly 100, apparatus 140, and/or computing device 200 are deployed. As discussed elsewhere herein, computing device 200 can measure, interpret, etc., various measurements by and/or inputs to sensor 118 to be recorded as biological data 300. Biological data 400 can also include one or more fields of identifying information for each measurement, e.g., a time stamp, serial number of sensor(s) 118, time interval for each measurement, etc. Biological data 300 can thereafter be provided to communication assembly 100 (FIGS. 1-2), e.g., for transmission to a remote location. To exchange data between computer system 200 and sensor 118, computer system 200 can be in communication with acoustic sensor 118 through any currently known or later developed type of electrical communications architecture, including wired and/or wireless electrical couplings through circuit board 102 (FIGS. 1-2) as described elsewhere herein. To evaluate the condition of one or more animals, monitoring program 220 of animal monitoring system 206 can store and interact with biological data 300 according to processes of the present disclosure.

Biological data 300 can optionally be organized into a group of fields. For example, biological data 300 can include fields for storing respective measurements, e.g., pH level of one or more fluids, water intake, gas exchange properties, calving status, speed, acceleration, etc. Biological data 300 can also include calculated or predetermined referenced values for each field. For instance, biological data 300 can include a set of baseline and/or training data used in comparison to evaluate the health of an animal, and such data can be included with biological data 300 or otherwise stored in memory 212. Biological data 300 can also include threshold and/or tolerance values for comparing baseline values with values measured for a specific animal to evaluate the condition of an animal where computer system 200 is deployed. Each form of biological data 300 can, in addition, be indexed relative to time such that a user can cross-reference various forms of biological data 300. It is also understood that biological data 300 can include other data fields and/or other types of data therein for evaluating the condition of one or more animals as described herein.

Biological data 300 can also be subject to preliminary processing by modules 222 of monitoring program 220 before being recorded in memory 212. For example, one or more modules 222 can apply a set of rules to interpret inputs from sensors 118 to further evaluate and/or monitor the health of an animal. Such rules and/or other criteria may be generated from predetermined data and/or relationships between various quantities. For example, an operator may determine that temperature values exceeding an upper threshold may indicate that the animal is experiencing an illness or other health problem, while temperature values being below a lower threshold may indicate one or more related health events of an animal, e.g., other forms of illness, communication assembly 100, sensor 118, and/or apparatus 140 being expelled from the animal, changes in weather or the environment, etc.

Computing device 200 can comprise any general purpose computing article of manufacture for executing computer program code installed by a user (e.g., a personal computer, server, handheld device, etc.). However, it is understood that computing device 200 is only representative of various possible equivalent computing devices that may perform the various process steps of the disclosure. In addition, computing device 200 can be part of a larger system architecture operable to monitor the biological data of one or more animals. In addition, sensor 118 can include one or more sub-components configured to communicate with controller 112 to provide various inputs to animal monitoring system 206. In particular, sensor 118 can include one or more transducers and/or measurement functions 310 electrically driven by a sensor driver 312 included in sensor 118. In an example embodiment, sensor 118 can take the form of a digital thermometer in which sensor driver 312 electrically powers one or more instruments for measuring the temperature of an animal. Transducer and/or measurement functions 310 can thereafter communicate recorded data (e.g., temperature data and time of measurement) to animal monitoring system 206 for storage or analysis. In some instances, it is understood that sensor driver 312 may include or otherwise be in communication with battery 110 (FIGS. 1-2) for electrically driving the operation of communication assembly 100 (FIGS. 1-2), apparatus 140 (FIGS. 1-2), etc.

To this extent, in other embodiments, computing device 200 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 200 may include a program product stored on a computer readable storage device, which can be operative to automatically monitor the health of animals and transmit biological data 300 to communication assembly 100 (FIGS. 1-2).

In embodiments where sensor(s) 118 include a motion sensor (e.g., gyrometer, accelerometer, speedometer, etc.), sensor 118 can include additional features and/or operational characteristics to monitor animal health based on motion-related data. In an embodiment, sensor(s) 118 in the form of a motion sensor can be placed externally on an animal (e.g., on the neck) or within the animal (e.g., by way of an ingestible bolus configured for use within the rumen, or other devices configured for internal insertion within an oral, nasal, vaginal, rectal, and/or other cavity of an animal) to measure an animal's movements. In such cases, sensor 118 can take the form of an accelerometer for recording samples of an animal's movement over time. In this case, controller 112 can manage data acquisition by sensor(s) 118 and can convert the raw measurements into statistical data, reports, etc., transmitted from communication assembly 100. The movement-related data collected with sensor(s) 118 can allow a user to determine activity and related biological data of the cow during the time at which the sample data is taken. Such data can include, e.g., ingestion, rumination, sleeping, walking, drinking, socializing, etc. Sensor(s) 118 in the form of a motion sensor may be structured to operate over a wide range of temperatures (e.g., from approximately −20° C. to approximately −60° C.), with data packets of movement data being collected at routine intervals (e.g., once every thirty minutes). The various components of communication assembly 100 can allow sensor 118 to measure data over a range of e.g., at least approximately seven hundred meters and up to approximately 3.2 kilometers.

Sensor(s) 118 in the form of an accelerometer, gyrometer, etc., can obtain, interpret, and manage data by specific techniques adapted for roaming animals. In particular, sensor(s) 118 which include one or more motion sensors can project various kinematic data onto three different axes (e.g., X-axis, Y-axis, and Z-axis) in three-dimensional space. Sensor(s) 118 can measure its acceleration, speed, etc., and project its raw value into one of the three axes by way of motion analysis techniques currently-known or later developed. Such data can be further processed by models incorporating one or more of, e.g., permanent acceleration or movement of an animal based on biological functions, behavior patterns of the animal (e.g., cows and/or other animals may almost never move backwards), for plotting, tabulation, and/or other mathematical expression in a modified coordinate system (i.e., a three-dimensional space in which the animal's permanent acceleration or movement defines one reference axis). The data expressed in such a modified coordinate system can then be transmitted from communication assembly (e.g., with antenna 106) and processed by a remote database or data processing system (e.g., base station 406 (FIG. 5) discussed elsewhere herein). As described elsewhere herein, each measurement can thus be broken into distinct components along a reference axis in a three-dimensional space, and paired with specific serial numbers, time stamps, measurement time intervals, etc., for efficient organization in memory and/or in a remote database. Where multiple sensor(s) 118 are used to measure different forms of biological data 300, each measurement can include an identifying value, bit, etc., for indicating whether the measurement represents a temperature measurement, motion measurement, and/or other property of an animal.

Referring to FIGS. 1-4 together, embodiments of the disclosure can include processes for varying the operation and power consumption of communication assembly and/or apparatus 140 to yield a prolonged operational lifespan. Although the various processes are described herein as being executed in a sequential and/or alternative order, it is understood that the various processes described herein may be reordered and/or executed substantially simultaneously to suit varying applications.

At process P1, shown in phantom to illustrate an optional preliminary process, a user can actuate switch 114, e.g., with magnet 116 to initiate collection of biological data according to the disclosure. In example embodiments described herein, actuating switch 114 can include bringing magnet 116 into close proximity with switch 114 to provide a signal to controller 112 for initiating data collection. At this time, communication assembly 100 and/or apparatus 140 can transition from an "off" or "dormant" state to a "non-active" or "active" operating mode in which sensor 118 collects biological data over an initial time interval.

In process P2, sensor 118 can collect one or more forms of biological data pertaining to an animal to monitor the animal's status over time. Process P2 can additionally or alternatively include modules 222 collecting and/or converting measurements from sensor 118 for inclusion as biological data 300. Process P2 can include one instance of data collection, or can include taking several measurements of biological data before the proceeding to other processes. Embodiments of the disclosure can include operating communication assembly 100, controller 112, sensor 118, apparatus 140, etc., such that each measurement occurs only after a predetermined time interval (e.g., six hours, twelve hours, twenty-four hours, etc.) to reduce power consumption of battery 110 during operation. Measuring biological data of an animal in process P2 can also include transmitting the collected data from communication assembly 100 as one or more data packets, e.g., by way of antenna 106, to a remote base station (e.g., base station 406) as also discussed herein relative to FIG. 5. Before being transmitted from communication assembly 100, data packets collected, e.g., with sensor(s) 118 can be stored locally in memory 212 of controller 112 (e.g. in a flash memory storage). Such data packets can be automatically deleted from memory 212 after being transmitted from communication assembly 100 and/or being received by base station 406. In some cases, methods according to the disclosure may trigger operation of display 109, e.g., by beginning or ending one or more audiovisual communications for indicating the status of communication assembly 100 or measurements pertaining to one or more animals.

Processes according to the disclosure can include adjusting the frequency of measurement by sensor 118 and accompanying transmissions from communication assembly 100. At process P3, the time interval between measurements of sensor 118 can be dependent upon whether sensor 118 is operating in an "active mode" or a "non-active mode." The "non-active mode" can generally correspond to a default operating mode designed, e.g., to transmit data less frequently for healthy animals. At process P3, modules 222 can determine whether sensors have been enabled to operate in "active mode." Where sensors 118 are continuing to operate in a "non-active mode," (i.e., "No" at process P3), the flow can proceed to process P4 in which modules 222 determine whether any attributes in biological data 300 exceed a threshold value for the non-active mode. Such cases may correspond to, e.g., a temperature of the animal being excessively high and thus indicating a risk of illness. In the event that one or more threshold values have been exceeded (i.e., "Yes" at process P4), the flow can proceed to process P5 in which modules 222 enable "active mode" operation of sensors 118 to take measurements more frequently. In addition, a subsequent process P6 can include adjusting (e.g., increasing or reducing) the time interval between measurements by sensor 118.

In cases where active mode has previously been enabled (i.e., "Yes" at process P3"), the flow can proceed to process P7 in which modules 222 determine whether data obtained with sensor 118 exceeds a predetermined expulsion threshold for an animal. The expulsion threshold may correspond to a temperature or other condition in which, e.g., sensors 118 and other components have been ejected from a birth canal when the animal gives birth to offspring, or from another part of an animal under different conditions. Such cases may typically be associated with a lower-than expected temperature, increased values of moisture, speed and acceleration being equal to zero for more than two days, etc. Where the expulsion threshold is not exceeded (i.e., "No" at process P7), the flow can proceed to subsequent steps. Where modules 222 determine that sensor 118 has been expelled from an animal, the flow can proceed to process P8 in which controller 112 deactivates sensors 118 and/or powers down other electrically driven components. The present disclosure can also include sending a notification, e.g., in process P9, by transmitting a signal from communication assembly 100 to indicate that sensor 118 has been expelled from the animal. In such cases, the flow can conclude ("Done") after the sensor 118 is deactivated and the user is notified of the expulsion. In other cases, the flow can proceed to process P10 in which controller 114 waits for a predetermined time interval (e.g., several hours depending on user input and/or operating mode) before the flow concludes ("Done") or returns to process P2 of measuring additional data with sensor 118. Through the various processes described herein, the power consumption and reporting time between individual measurements can be varied to reduce total power consumption and accommodate various events during an animal's lifespan.

Figure 5:
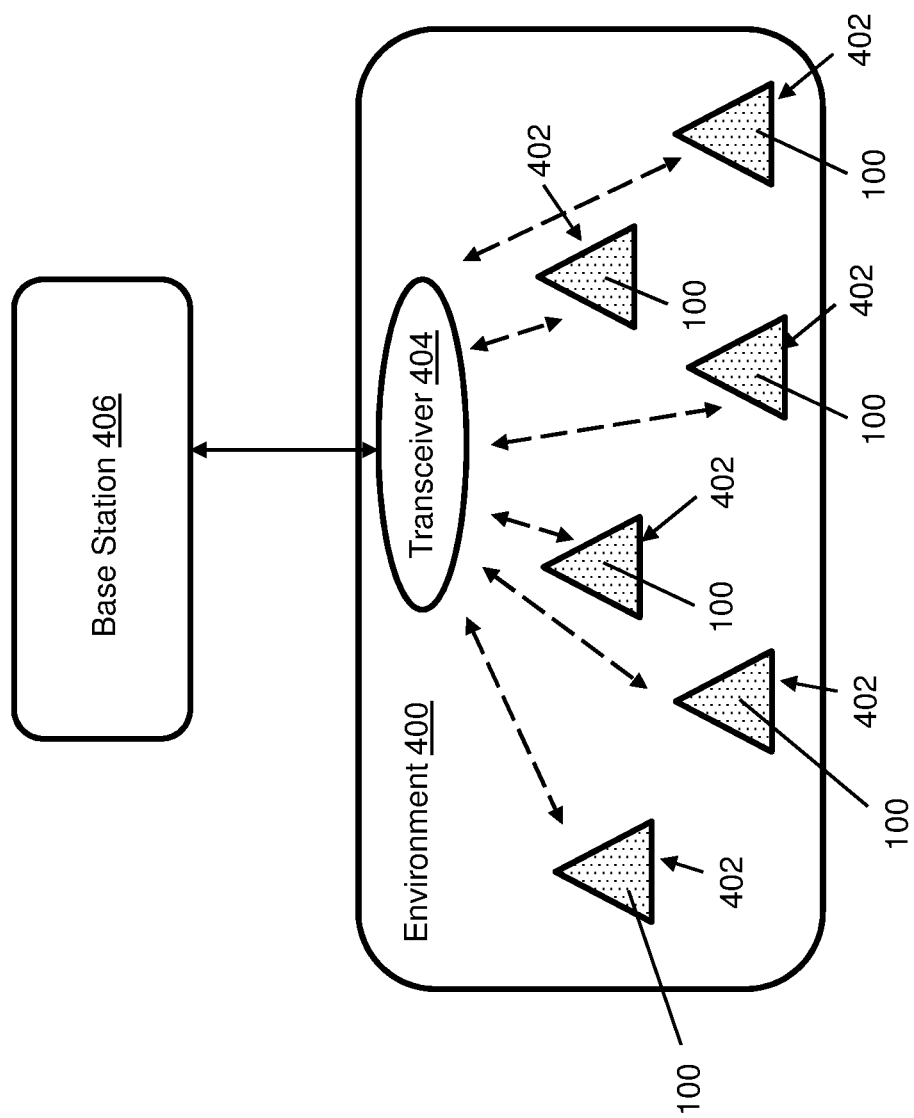
FIG. 5 shows a schematic view of a system for implementing multiple apparatuses and assemblies in multiple animals according to embodiments of the disclosure.

Referring to FIGS. 1-2 and 5 together, the use of communication assemblies 100 in a single environment 400 to monitor multiple animals 402 (depicted as triangles for simplicity) is described. Environment 400 as depicted may take the form of an enclosure for housing a large number of animals 402 therein. In an example embodiment, environment 400 can take the form of a farm plot with multiple animals 402 in the form of cows. An operator may desire to monitor the condition of each animal 402 in environment 400. One or more animals 402 can have respective communication assemblies 100 as described herein, and/or may be associated with particular controllers 112, sensors 118, apparatuses 140, etc. Communication assemblies 100 thus may be housed within an internal organ of each animal 402, and/or may be carried externally through collars, ID tags, etc. Regardless of where communication assemblies 100 are located, a transceiver 404 can be positioned in environment 400 to exchange data signals with each communication assembly 100 to monitor the health of each animal 402 over varied intervals. Transceiver 404 may be configured to send and receive data adapted for the particular type of communication assembly 100 and environment 400 being used, and as an example may include a wireless transceiver configured to send signals to and/or receive signals from a low-power wide-area network (LPWAN) or low-power network (LPN), e.g., to communicate at a reduced bit rate to enable operation over extended separation distances from communication assemblies 100.

Transceiver 404 can be placed in communication with a base station 406, which may be within environment 400. Alternatively, base station 406 may be in a position proximate or distal to environment 400. Base station 406 can also include, e.g., a central terminal, computer system, or other access point for allowing a user to access and/or interact with data provided from each communication assembly to transceiver 404. Regardless of the infrastructure employed to provide communication between transceiver 404 and communication assemblies 100, it is understood that transceiver 404 and base station 406 can be communicatively coupled to each other through one or more conventional networks for communicating over long distances, e.g., cable or satellite-based networking without regard to power consumption, separation distance, bit rate, etc. A user can thus access base station 406 to monitor the health of each animal 402 in environment 400 by viewing and interpreting various forms of biological data measured by sensor(s) 118 and transmitted through communication assembly 100.

Regardless of the type of sensor(s) 118 included in communication assembly 100, communication assembly 100 can be structured to manage the amount of data stored therein based on communication with base station 406 and/or temporary loss of communications access to base station 406. In particular, communication assembly 100 can include structural operational features for accounting for situations where animals 402 in environment 400 leave the operable communications range for transmitting data to transceiver 404 with antenna 106. In an embodiment, new measurements recorded by sensor(s) 118 can be stored locally in communication assembly 100, e.g., in memory 212 (FIG. 3) of controller 112, e.g., as biological data 300 (FIG. 3). Modules 222 (FIG. 3) of controller 112 can be configured automatically remove locally stored measurements after antenna 106 successfully transmits such measurements to base station 406. In the event that no further data can be stored locally in communications assembly 100 (e.g., due to animal(s) 402 being outside the range of transceiver 404 and antenna 406 for several days), modules 222 of controller 112 can be configured to automatically delete the oldest-dated data packet for make room for the next measurement (i.e., FIFO storage). Such settings may also be managed, modified, etc., by a user to suit different types of environments 400, animals 402, etc.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A communication assembly configured to monitor biological data of an animal, the communication assembly comprising:
a radio transceiver mounted on a circuit board, wherein the radio transceiver comprises a low-power wide-area network (LPWAN) card;
an antenna electrically coupled to the circuit board, wherein the antenna is configured to transmit signals at a frequency of between approximately 850 megahertz (MHz) and approximately 950 MHz from a monitored organ of the animal, and through a body of the animal;
a sensor coupled to the circuit board, and configured to monitor biological data of the monitored organ of the animal;
a casing encapsulating at least the radio transceiver, and the antenna, wherein the casing includes a biocompatible material, wherein the casing is adapted to fluidly separate the radio transceiver, the resinous material, and the antenna from the monitored organ of the animal; and
a controller electrically coupled to the radio transceiver, the circuit board, and a battery, wherein the controller performs actions including:
causing the sensor to monitor biological data of the monitored organ of the animal,
causing the antenna to transmit the biological data to a remote system,
determining whether the biological data exceeds an expulsion threshold, and
deactivating the sensor and the radio transceiver in response to the biological data exceeding the expulsion threshold.

2. The communication assembly of claim 1, further comprising a magnetically-operated switch coupled to the controller, wherein the switch is configured for actuation by a magnet external to the animal, and wherein the switch selectively causes the radio transceiver to adjust a predetermined interval for transmitting signals from the antenna.

3. The communication assembly of claim 2, wherein the magnetically-operated switch and the antenna are positioned at opposing ends of the communication assembly.

4. The communication assembly of claim 1, wherein the sensor comprises a plurality of sensors electrically coupled to the controller, each of the plurality of sensors being configured to measure a respective status condition of the animal.

5. The communication assembly of claim 4, wherein one of the plurality of sensors comprises one of an accelerometer or a gyrometer, and wherein the status condition of the animal comprises one of: an activity level of the animal, a position of the animal, a movement of the animal, or an action of the animal.

6. The communication assembly of claim 4, wherein the sensor comprises a ruminal thermometer, and wherein the status condition of the animal comprises an internal temperature.

7. The communication assembly of claim 1, wherein the antenna is printed onto the circuit board or mounted onto the circuit board.

8. A communication assembly configured to monitor biological data of an animal, the communication assembly comprising:
a radio transceiver mounted on a circuit board, wherein the radio transceiver comprises a low-power wide-area network (LPWAN) card;

an antenna electrically coupled to the circuit board, wherein the antenna is configured to transmit signals at a frequency of between approximately 850 megahertz (MHz) and approximately 950 MHz from within a monitored organ of the animal, and through a body of the animal;

a controller electrically coupled to the radio transceiver, the circuit board, and a battery, wherein the radio transceiver adjusts a power output of the battery through the controller to transmit signals from the antenna at a predetermined interval, wherein the controller performs actions including:

causing the antenna to transmit biological data for the monitored organ of the animal to a remote system, determining whether the biological data exceeds an expulsion threshold, and deactivating the sensor and the radio transceiver in response to the biological data exceeding the expulsion threshold;

a temperature sensor electrically coupled to the radio transceiver, and configured to monitor the biological data of a monitored organ of the animal; and a casing encapsulating at least the radio transceiver, the antenna, and the resinous material therein, wherein the casing includes a plastic or ceramic material.

9. The communication assembly of claim 8, further comprising a magnetically operated switch coupled to the controller, wherein the switch is configured for actuation by a magnet external to the animal, and wherein the switch selectively causes the radio transceiver to adjust a predetermined interval for transmitting signals from the antenna.

10. The communication assembly of claim 9, wherein the magnetically operated switch and the antenna are positioned at opposing ends of the communication assembly.

11. An apparatus for monitoring communicating biological data for a monitored internal organ of an animal, the apparatus comprising:

a radio transceiver mounted on a circuit board, wherein the radio transceiver comprises a low-power wide-area network (LPWAN) card;

an antenna electrically coupled to the circuit board, wherein the antenna is configured to transmit signals at a frequency of between approximately 850 megahertz (MHz) and approximately 950 MHz from within the monitored organ of the animal, and through a body of the animal;

a ruminal thermometer in communication with the antenna, and configured to monitor a temperature of the monitored internal organ of the animal;

a magnetically operated switch coupled to the antenna, wherein the switch is configured for actuation by a magnet external to the animal, and wherein the switch selectively causes the radio transceiver to adjust a predetermined interval for transmitting signals from the antenna;

a resinous material encapsulating the antenna and the radio transceiver therein, wherein the antenna is configured to transmit signals from the radio transceiver through the resinous material;

a casing encapsulating at least the radio transceiver, the antenna, and the resinous material therein, wherein the casing includes a plastic or ceramic material that is biocompatible with respect to the monitored internal organ of the animal, and wherein the casing is adapted to fluidly separate the radio transceiver, the resinous material, and the antenna from the monitored internal organ of the animal; and a controller electrically coupled to the radio transceiver, the circuit board, and a battery, wherein the controller performs actions including:

causing the ruminal thermometer to monitor biological data of the monitored internal organ of the animal, causing the antenna to transmit the biological data through the internal organ of the animal to a remote system, determining whether the biological data exceeds an expulsion threshold, and deactivating the sensor and the radio transceiver in response to the biological data exceeding the expulsion threshold.

12. The apparatus of claim 11, further comprising a plurality of external mounts protruding outwardly from the casing, each of the external mounts including an adhesive material configured to removably attach the casing to the internal organ of the animal.

13. The apparatus of claim 11, wherein the casing is positioned within an ingestible bolus.

14. The apparatus of claim 11, further comprising a sensor communicatively coupled to the circuit board, the sensor configured to measure biological data of the animal, and wherein the antenna transmits the signals with the biological data through the monitored internal organ of the animal to a remote station.

15. The apparatus of claim 11, further comprising a display operatively coupled to the radio transceiver and the antenna, the display being configured to visually communicate operational data of the apparatus, wherein the resinous material and the casing each comprise a transparent material or a translucent material, and wherein the display is visible to an observer through the resinous material and the casing.

16. The communication assembly of claim 1, further comprising a plurality of external mounts protruding outwardly from the casing, each of the external mounts including an adhesive material configured to removably attach the casing to the monitored organ of the animal.

* * * * *